3,102,031
HIGH PROTEIN FOOD GRANULES

Robert V. MacAllister, Clinton, Iowa, and Thomas P. Finucane, Hartsdale, N.Y., assignors to General Foods Corporation, White Plains, N.Y., a corporation of Delaware
No Drawing. Filed Mar. 5, 1962, Ser. No. 177,252
7 Claims. (Cl. 99—14)

This invention relates to a high protein food product, and more particularly to one which, although made predominantly from vegetable materials, has, when cooked, a flavor and chewy texture simulating the eating quality of meat. The present application is a continuation-in-part of Serial No. 816,670, filed May 29, 1959, now abandoned, and Serial No. 856,384, filed December 1, 1959, now abandoned.

As described herein, the food product is made from inexpensive sources of vegetable protein, of which wheat gluten and soybean flour are preferred materials. The product is highly nutritious and is capable of simulating not only the flavor and texture of cooked meat but also its savory appearance. It may be prepared in accordance with a variety of cooking recipes and is suitable for such conventional entrees as meat patties, hamburgers, sausages, etc., as well as other more unusual table delicacies. It is prepared in dry form, requires no refrigeration, and may be stored, shipped, and sold in ordinary containers.

Generally speaking, the product comprises irregularly shaped, substantially dry, discrete granules capable of absorbing water and comprising essentially wheat gluten and soybean flour. Suitable flavoring materials are present to give the cooked product the taste of cooked meat. When cooked in the presence of water, the granules develop a flavor and chewy texture characteristic of cooked meat and they acquire the appearance of cooked chopped meat. It is desirable to employ minor proportions of egg albumin and starch in conjunction with the gluten and soy flour. The albumin adds to the chewiness of the cooked granules, while the starch supplies binder-like properties. Additional ingredients comprise at least one meat flavor, salt and spices.

The granules may be conveniently prepared by forming the ingredients into a doughy mix which is then extruded, cut to the desired size, and dried. Preferably, at least one meat flavor is made up in the form of an emulsion and added to the doughy mix prior to the extrusion of the latter.

More particularly, the doughy mix is made by dry blending in a suitable mixer the gluten, soy flour, albumin, starch, meat flavor, salt, and spices. If desired, vitamins and minerals may be added to the mix. Another meat flavor, such as beef extract which is soluble in water, is formed into an emulsion by adding the beef extract to water, heating the mixture with agitation to dissolve the extract, adding a suitable oil such as hydrogenated cottonseed oil and continuing the heating to melt the oil, adding stabilizing salts like sodium stearate and calcium chloride, and homogenizing the mixture to form a relatively stable emulsion.

Preferably the emulsion is a water-in-oil one, it having been found that by surrounding the beef extract-containing water with the continuous oil phase of the emulsion, the removal of the beef extract flavor from the water is slowed down, with the result that the taste of the flavor is prolonged in the resulting product. In other words, if the flavor-containing water particles of the emulsion were not surrounded by the oil phase, the flavor would tend to be removed or leached out from the water and be transferred to the surrounding environment, such as the gravy or other food materials in which the cooked granules are disposed. This in turn would leave the granules themselves depleted of their flavor content with the result that they would lose at least a part of the meat taste. The emulsion is added to the dry mix and blended therewith in the same apparatus. Following this, an aqueous solution of a dye is added to the mixture and blended therein for an additional period. The mixture at this point is in the form of a dough which is then extruded in the form of one or more rodlike strands and immediately cut to form short lengths or small pellets or granules. These are then dried and screened to obtain a uniformly sized product. Care is exercised during drying to limit the temperature and time of drying so as not to impair the nutritional value of the product as by degrading the protein. It should be noted that the emulsion further serves to introduce vegetable fat to the food product, and it also aids in the extrusion of the dough by functioning as a lubricant.

Considering the ingredients in more detail, the gluten is preferably wheat gluten because of its commercial availability and low cost, although rye gluten may be used. In general, any cereal-derived gluten having an amino acid content and distribution similar to wheat gluten is suitable. Glutens high in lysine are particularly desirable. If desired, combinations of wheat flour and rye flour, or other flours having dough-forming properties, or the glutens derived from them, may be used. Whatever gluten is used, it is particularly desirable that it shall be a "vital" or "vitalized" gluten, by which is meant undenatured or unmodified gluten and also one that is in a resilient or gummy condition. In other words, vitalized or undenatured gluten is one that has not been subjected to high heat for any considerable period of time such as would denature the protein content thereof. The vitalized gluten lends the quality of chewiness to the product granules and also tends to hold together the other ingredients thereof by virtue of its gummy or film-forming properties. The gluten may suitably comprise about 49.5% by weight of the product granules and may range from 40 to 60%. A broader range is 20 to 70%.

The soybean flour is preferably any clean, essentially bland material which has been solvent extracted in a conventional manner. More preferably, the soybean flour is any bland, odorless, colorless soybean material which has been treated in order to remove the undesirable bitter and beany flavor notes which are common in untreated soybean flours. Bland, odorless, colorless soybean material may be prepared by any of the many processes disclosed in the literature although any bland, odorless, colorless soybean material whether prepared by such processes or not may be employed in the present invention. Typically, such soybean materials may be prepared by solvent treatment, acid treatment or combinations thereof. Soy flour constitutes an inexpensive source of high quality, highly nutritious protein containing, as it does, all essential amino acids; it provides the product granules with a high protein content. A suitable amount of flour is about 20 to 28% by weight of the product granules, although it may range from 10 to 35% and more broadly from 15 to 60%.

Of interest is the fact that the soy flour and gluten potentiate each other, that is, each increases or enhances the value of the other so that the use of both together provides advantages over and above their individual advantages. Thus, from a physical standpoint, the gluten is a gummy material which is difficult if not impossible to extrude per se, but by the addition of the soy, an extrudable product is formed. From a nutritional standpoint, the amino acid content or pattern of the soy complements that of the gluten, and vice versa. For example, the soy flour is relatively high in lysine, whereas the gluten is relatively low in this acid; the use of both materials provides a better balanced lysine content.

Again, the gluten is relatively high in methionine, whereas the soy is relatively low in this acid, while both together provide a more desirable concentration of methionine.

The albumin is preferably obtained from eggs, but sources such as milk, fish, elastin, keratin, etc., are also suitable. Other useful materials which have the same functional properties as egg albumen can be obtained from the sources such as fish muscle, blood, and certain vegetable proteins. To facilitate handling, the albumin is employed in dehydrated form. It constitutes a supplementary source of desirable amino acids and also contributes a quality of chewiness after it has been coagulated, a step which occurs when the product granules are cooked. The albumin may be used in an amount of 2 to 10% by weight of the product, preferably 3 to 5%, and a particular amount is about 4.8%.

The preferred starch is wheat starch, although other suitable sources include tapioca starch, corn starch, amioca starch, potato starch, sago starch, rice starch, etc. The starch is preferably ungelatinized but may be gelatinized. It is useful as a binder, in conjunction with the gluten, to hold together the various ingredients of the product. The gluten and/or starch may be considered to form a continuous all-embracing matrix for the ingredients. The starch also provides an amount of carbohydrate as an element in the overall nutritional value of the product. The starch may be used in amounts of 2 to 10% by weight of the product, preferably 3 to 5%, and more preferably about 4.2%.

As a dry meat-like flavor, hydrolyzed vegetable protein is a preferred material, the amount being variable depending on the taste desired, with 0.5 to 5% by weight usually sufficing. More preferably, 1.0 to 2.5%, and particularly 1.5%, may be used. Other dry meat-like flavors include monosodium glutamate, yeast hydrolyzates, yeast autolyzates, and other suitable synthetic materials.

The spices for the product usually comprise onion powder, garlic powder, and ground black pepper in desired quantities. Salt in flake form is also a usual ingredient in amounts to suit the taste.

The meat flavor added to the product by incorporation in the emulsion is preferably beef extract in amounts up to 5% by weight of the product, preferably 1.0 to 2.5%, with 1.7% as a particular quantity. Other useful flavors in addition to or in place of the beef extract include the dry materials recited above. If desired, the extract may be omitted and reliance placed on the dry flavor material.

The hydrogenated cottonseed oil for making the emulsion also serves to provide some vegetable fat in the product. A suitable specific amount of the oil is 6.9% by weight, preferably 4 to 7%, while a broader range is 2 to 15%. Other appropriate vegetable oils are unhydrogenated cottonseed oil, corn oil, sesame oil, safflower oil, coconut oil, olive oil, etc.

The stabilizing salts for the emulsion are usually sodium stearate in an amount of 0.008 to 2.00% by weight of the product and calcium chloride in an amount of 0.10 to 0.60%. Sodium palmitate, sodium linoleate, sodium oleate, calcium phosphate, calcium tartrate, calcium gluconate, calcium fumarate, calcium sulphate, and the like, comprise other useful salts.

Conventional colors in convenient amounts are employed for imparting a desirable color in the product both in the dry and cooked states. Illustrative non-harmful specific colors are F.D. & C. Red #1, F.D. & C. Blue #1, Black Shade "B," Jell-O Shade "C," etc.

On a chemical basis, the product may have a protein content of about 60% by weight, although this may vary from 40 to 70%. As may be apparent, a major amount of the protein, upwards of 90 to 93%, is of vegetable origin. A particular merit of the invention is that the protein content of the product has a nutritionally balanced amino acid distribution. If desired, one or more amino acids per se may be added to the mixture, either the dry mix, or the emulsion, or the dough, during the course of preparation to fortify the same with respect to any particular acid or to bring the overall amino acid pattern into better balance. The protein:fat ratio is usually about 10:1, but may vary from 1:1 to 20:1. The fat content of the product is preferably low and is entirely of vegetable origin. As may also be apparent, the product comprises a low calorie food, providing about 4.0 to 5.0 calories per gram. The moisture content of the granules usually ranges from 3.7 to 6.5% by weight.

Physically, the product comprises irregularly shaped, substantially dry, discrete, dust-free granules or kernels. They normally have a brown color although this is variable. They are preferably small in size, measuring about 1/8" x 1/8" x 1/16", or, stated another way, they will pass through a No. 4 but not a No. 10 mesh screen (basis, Tyler standard screen scale sieves). However, the size is variable and may range from particles only a fraction as large as the foregoing to particles several times larger. For example, other screen size combinations may be used to permit the granules to pass through a No. 4 screen and collect on a No. 8; or through No. 8 and on No. 20; or through No. 4 and on No. 20 etc. Screening helps to break up agglomerates of granules that sometimes tend to form. It is desirable that the granules shall be of varying sizes, the better to simulate the texture of cooked meat, and this may be brought about by employing an extrusion die for the doughy mix which has a plurality of differently sized openings, or by using a plurality of different dies to produce differently sized granules and combining the latter. In some cases it may be desirable not to break up the agglomerates which tend to form, so that the granules would comprise unagglomerated pellets and agglomerates of varying size, thus approximating the characteristics of chopped meat. The granules are edible in the uncooked or as-produced state, exhibiting a relatively hard crunchy texture; however, and as will be understood, they are intended to be cooked. In the dry state they have a density (loose) of about 0.4 to 0.6 gram/cc. They are particularly marked by their power to adsorb water, being capable of adsorbing up to their own weight or more of water.

When cooked in the presence of water, the granules develop a flavor and chewy texture which is characteristic of cooked meat and they acquire the appearance of cooked chopped meat. They have versatile end uses. Thus, they may be added to a sauce such as tomato sauce to form a meat sauce. If desired, they may be hydrated and added to chopped meat to provide a mixture having an increased or extended protein content. They are compatible with meat in general and can be added to many varieties. As indicated, they are useful wherever chopped meat is specified in recipes. In this connection, the use of the granules accords an advantage in that cooking losses are reduced; thus, where fat is lost from meat by being allowed to remain in melted form in the cooking pan and discarded, in the case of the protein granules the fat tends to be absorbed by the granules. By means of a suitable extraneously prepared binder, they may be formed into various shapes and cooked to produce meat patties, hamburgers, cubes, meat loaf, etc. As a binder, a formed mixture of starch and egg white is suitable, using a 1:1 by weight proportion of starch to egg white, although this proportion may vary from 0.5:1.5 to 1.5:0.5. When the granules are shaped into a given form by means of the binder, the shape is retained even after cooking. Suitably, the amount of foam may be 1 to 10% by weight, usually 5%, based on the bound granules, dry basis. It is also possible to shape the granules individually into desired forms by means of suitable treatment applied to them immediately after leaving the extrusion die, i.e., when they are still in a more or less plastic condition. For example, they may be passed between spaced rolls to flatten them, thereby forming platelets. The latter comprise desirable shapes for forming into other larger shapes by means of the binder.

In sterility tests the granules exhibited bacteriological levels acceptable for human consumption.

The granules are storable at room temperatures over long periods of time without noticeable changes in their original flavor and chewiness. In one test under temperature and humidity conditions approximating those prevalent in Jacksonville, Florida, the protein granules were still in excellent condition as regards their flavor and texture after three months' storage in conventional paper containers.

The invention may be illustrated by the following examples:

Example 1

A fifty-pound (dry basis) batch of protein granules was prepared. A mixture of the following dry ingredients was made up:

| Ingredient | Percent |
|---|---|
| Vitalized wheat gluten | 49.5 |
| Defatted soybean flour | 27.9 |
| Egg albumin | 4.8 |
| Wheat starch | 4.2 |
| Hydrolyzed fish protein | 1.5 |
| Onion powder | 1.0 |
| Salt flake | 2.0 |
| Garlic powder | 0.02 |
| Ground black pepper | 0.04 |

All percentages are by weight based on the dry protein granules. These ingredients were dry blended in an Abbey (Sigma blade) mixer for ten minutes.

A beef extract emulsion was prepared by adding 12.25 lbs. of water to a steam jacketed kettle, and then adding 3.33 lbs. of beef extract to the water. The mixture was heated with agitation to 190–200° F. to dissolve the beef extract, after which 13.35 lbs. of hydrogenated cottonseed oil (HCSO) was added and melted in the mixture. Then 75.7 grams of sodium stearate was dissolved in the mixture and the latter was subjected to mixing in a Kolloidtek Puc Mill; then 281 grams of calcium chloride dissolved in 500 ml. of water was added to the foregoing mixture and the batch was subjected to further mixing in the Puc Mill. There was prepared by this procedure an emulsion batch weighing 30.82 lbs., of which 7.95 lbs. was taken and added to the above described dry-blended dry ingredients, and the resulting mixture was blended in the Abbey mixer for ten minutes. Thereafter a water-dye solution was prepared comprising 24 lbs. of water plus conventional amounts of F.D. & C. Red No. 1, F.D. & C. Blue No. 1, Black Shade "B," and Jell-O Shade "C." This water-dye solution was added to the material in the Abbey mixer and blended therein for seven minutes, thereby forming a colored dough which was ready for extrusion.

On the basis of the dry protein granules, the beef extract concentration was 1.7% by weight, the HCSO was 6.9%, the sodium stearate was 0.09%, and the calcium chloride was 1.3%.

The dough was transferred to a Braibanti macaroni press equipped with an auger which fed the dough to an extrusion head in which was disposed a die having a multiplicity of 0.13-inch (approximately ⅛″) diameter openings. As strands of dough came through the die openings, a cutter disposed adjacent the die severed the strands into lengths approximately 1/16″ long. The granules, having a moisture content of about 36% by weight, were collected in suitable containers and passed to a gas-fired tray dryer wherein the granules were disposed on six trays for approximately 20 minutes while air at 220° F. was circulated by them. After 20 minutes, the dried granules were cooled by means of fans to a temperature below 100° F. and were collected. They had a moisture content of about 7% by weight. The dried granules were then screened in a Rotex screener using No. 4 and No. 10 mesh screens, that is, those granules passing through the No. 4 screen but not the No. 10 were collected. Stainless steel balls were present on the No. 4 screen to break up oversized material.

Example 2

About 96 grams of the protein granules as prepared in Example 1 were mixed with 85 grams of precooked macaroni, 48.5 grams of a spice mix, tomato paste, and water, and the mixture was then placed in an oven. Ground Parmesan cheese was sprinkled over the top of the mixture, and the latter was baked for 45 minutes at 375° F. The resulting baked product constituted a savory, flavorful, casserole dish simulating a popularly known baked macaroni and meat granules entree.

Example 3

A fifty pound (dry basis) batch of protein granules was prepared. A mixture of the following dry ingredients was made up.

| Ingredients: | Percent |
|---|---|
| Vitalized wheat gluten | 55.512 |
| Deflavored soy | 21.913 |
| Egg albumin | 4.800 |
| Wheat starch | 4.230 |
| Beef extract | 1.711 |
| Hydrogenated cottonseed oil | 6.862 |
| Sodium stearate | 0.086 |
| Calcium chloride | 0.318 |
| Hydrolyzed veg. protein | 1.497 |
| Onion powder | 0.997 |
| Salt | 1.995 |
| Garlic powder | 0.020 |
| Black pepper | 0.040 |
| Color | 0.019 |

All percentages are by weight based on the dry protein granules. The granules were prepared by the method set forth in Example 1.

Example 4

About 96 grams of the protein granules as prepared in Example 3 were mixed with 85 grams of precooked macaroni, 48.5 grams of a spice mix, tomato paste, and water, and the mixture was then placed in an oven. Ground Parmesan cheese was sprinkled over the top of the mixture, and the latter was baked for 45 minutes at 375° F. The resulting baked product constituted a savory, flavorful, casserole dish simulating a popularly known baked macaroni and meat granules entree.

Nutritionally the granules compare favorably with meat. In one series of rat feeding tests, conducted on a protein basis, a mixture was prepared comprising about 100 grams of dry protein granules, 85 grams of precooked macaroni, 48.5 grams of a spice mix, and freeze-dried tomato paste, and this mixture was fed in the form of a dry mix to rats. At the same time, another mixture was prepared which was like the preceding one except that the protein granules were substituted by a half pound of chopped beef (rump) as purchased in the store, and this mixture was fed to rats as a dry mix. Like amounts of vitamins and minerals were present in both mixtures, that is, the same vitamins and minerals, and in the same amounts, were added to each mixture, it being known that such additions would not affect the protein quality evaluation. It was found that both mixtures were equivalent in protein quality as indicated by the weight gain of the rats and the protein efficiency ratio (P.E.R.), which is defined as the grams of body weight gained per gram of protein consumed. Thus, the meat-containing mixture gave an average body weight gain of 128 grams and a P.E.R. of 1.31, whereas the protein granule-containing mixture gave an average body weight gain of 124 grams and a P.E.R. of 1.27. These values are not significantly different.

While it is preferred, as described above, that the gluten shall be in the vitalized form, it is possible to employ devitalized or denatured gluten provided that the amount is increased or a supplement is used to supply chewing quality. Thus, devitalized gluten may be employed at concentration levels of 30 to 70%, preferably 50 to 60%. If a supplement is used, this can be selected from edible gums like karaya, carrageenin, alginate, agar, arabic, tragacanth, etc.; also modified cellulosic polymers like carboxymethylcellulose, ethylcellulose, etc. Only relatively small amounts, say 3 to 5% by weight of the protein granules, of such supplement are required. It is believed that the gluten and/or supplement is mainly responsible for the dust-free character of the granules.

The soy flour may be substituted in whole or part by defatted cottonseed flour, defatted fish flour, or other suitable high protein defatted flour preferably of non-animal origin, that is, of vegetable or fish origin. Corn gluten is also a suitable material for use in place of soy flour in whole or part. It is also possible to incorporate varying amounts of high protein flour of animal origin with the soy or other non-animal flour to obtain a variation in the amino acid content, the flavor, and/or the texture of the product. Desirably, the animal protein flour is derived from casein, lactalbumin, and beef, pork and other meats. Similarly, the use of fish protein flour may produce variations as described.

It is feasible to prepare the protein granules as a high protein feed concentrate for animal consumption. In this case, even less expensive source materials are suitable. Thus, instead of soy flour, there can be used the cheaper soy meal, comprising non-solvent extracted, ground soybeans; also useful are dehulled raw soybeans, or oil-free soybeans, whether in a cooked, cooked and toasted, or uncooked form. These materials are preferably in a reduced state commonly known in the art as flakes, meals, flours, bits, cracked beans, etc. For convenience, such state or states of reduction may be referred to as a subdivided state. In place of the vitalized gluten, the cheaper devitalized material can be used. The egg albumin may be replaced by a less expensive protein material such as fish protein. The foregoing three ingredients, by themselves, provide a suitable animal feed, although it is desirable to add a meat flavor.

By "gluten," as used herein, is meant not only gluten per se but also a gluten-containing material.

It is to be understood that the invention is not restricted to specific details of the foregoing description but is capable of obvious variations without departing from its scope.

What is claimed is:

1. A high protein food product which when cooked has a flavor and chewy texture simulating the eating quality of meat, said product comprising irregularly shaped, substantially dry, discrete granules capable of adsorbing water, said granules comprising essentially vitalized gluten and defatted soybean flour, and also incorporating a meat-like flavoring material, said gluten serving not only as a source of protein but also as a binder and providing the quality of chewiness in the cooked granules, said granules when cooked in the presence of water developing a flavor and chewy texture characteristic of cooked meat; and said granules being storable at room temperatures in conventional containers.

2. The food product of claim 1 wherein said granules contain a minor proportion of dehydrated albumin which supplements the protein content of the product and which, after coagulation during cooking, contributes to the chewiness of the cooked product.

3. The food product of claim 1 wherein said granules contain a minor proportion of starch which aids said gluten to bind the ingredients of said granules.

4. The food product of claim 1 wherein said flavoring material is incorporated in said granules, prior to drying of the latter, in the form of a water-in-oil emulsion, said flavoring material being water soluble.

5. A high protein, low fat, food product which when cooked has a flavor and chewy texture simulating the eating quality of meat, said product comprising irregularly shaped, substantially dry, discrete, relatively hard, dust-free granules, said granules being capable of adsorbing water in an amount up to the weight thereof, said granules comprising on a weight basis:

| | Percent |
|---|---|
| Vitalized wheat gluten | 20 to 70 |
| Defatted soybean flour | 15 to 60 |
| Dehydrated albumin | 2 to 10 |
| Starch | 2 to 10 |
| Moisture | 3.7 to 7 | said granules also containing a meat-like flavoring material and color; said gluten and soy flour providing a high proportion of protein in the granules, said gluten and albumin providing the quality of chewiness in the cooked granules, said gluten and starch having the properties of a binder and acting to hold together the other ingredients; said granules having a protein content of about 60% by weight of which a major amount is of vegetable origin, said protein content having a nutritionally balanced, qualitative and quantitative amino acid distribution, said granules having a protein:fat ratio of about 10:1, said fat content being entirely of vegetable origin; said granules being edible in the uncooked state and having, when so eaten, a relatively hard crunchy texture; said granules when cooked in the presence of water developing a flavor and chewy texture characteristic of cooked meat and also developing the appearance of cooked chopped meat; and said granules being storable at room temperatures in conventional containers and exhibiting during storage bacteriological levels acceptable for human consumption.

6. A high protein food product which when cooked has a flavor and chewy texture simulating the eating quality of meat, said product comprising irregularly shaped, substantially dry, discrete granules capable of adsorbing water, said granules comprising gluten and a high protein flour of non-animal origin, said granules also incorporating a meat-like flavoring material, said gluten providing not only an amount of protein in the granules but also the quality of chewiness in the cooked granules.

7. A high protein food product which when cooked has a flavor and chewy texture simulating the eating quality of meat, said product comprising irregularly shaped, substantially dry, discrete granules capable of adsorbing water, said granules comprising gluten and a subdivided high protein material, said granules also incorporating a meat-like flavor, said gluten providing not only an amount of protein in the granules but also the quality of chewiness in the cooked granules.

References Cited in the file of this patent

UNITED STATES PATENTS

| 670,283 | Kellogg | Mar. 19, 1901 |
| 2,560,621 | Wrenshall | July 17, 1951 |
| 2,623,825 | Tressler et al. | Dec. 30, 1952 |
| 2,802,737 | Anson et al. | Aug. 13, 1957 |
| 2,830,902 | Anson | Apr. 15, 1958 |
| 2,909,431 | Keller | Oct. 20, 1959 |

FOREIGN PATENTS

| 158,410 | Australia | Nov. 1, 1951 |